UNITED STATES PATENT OFFICE.

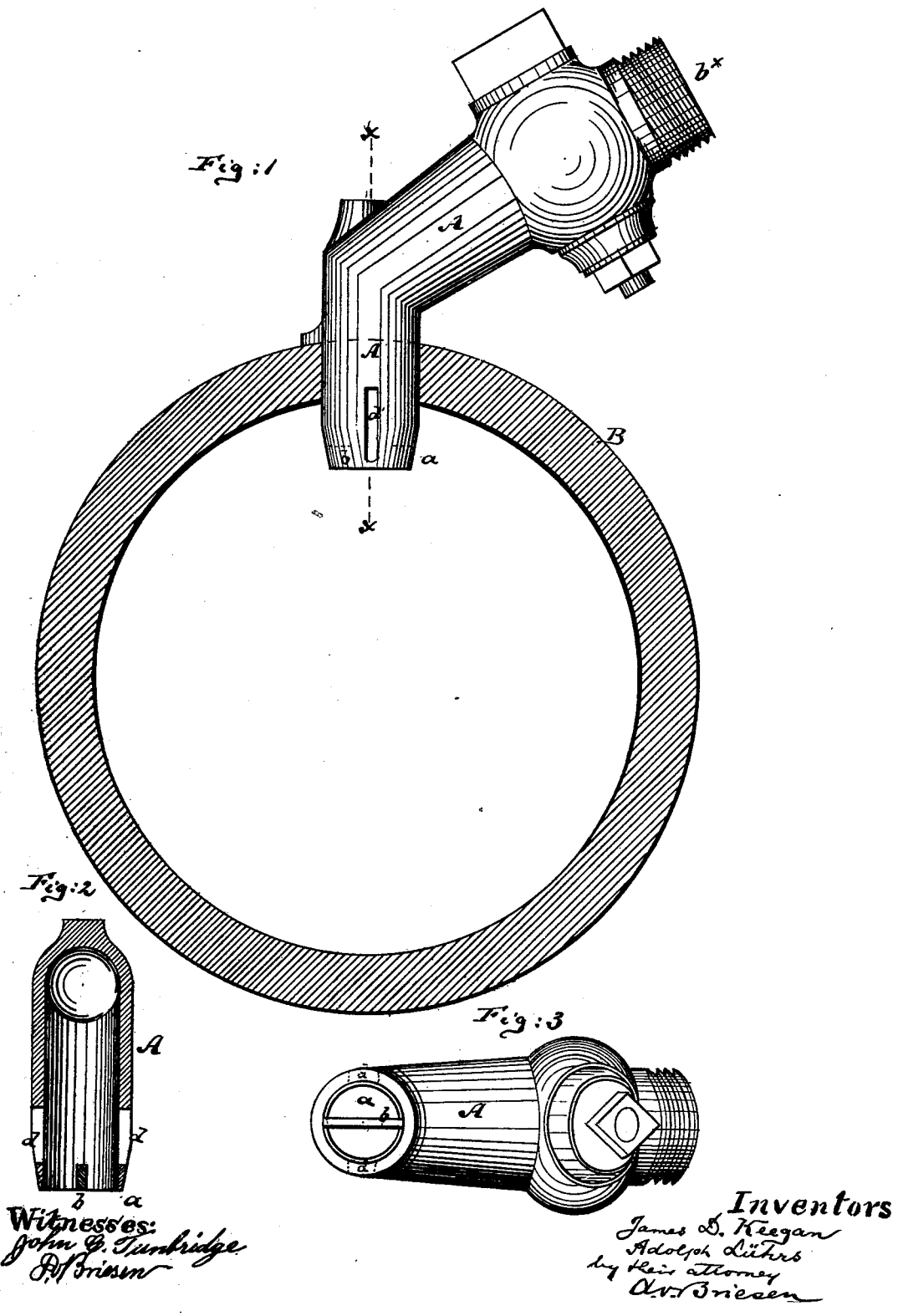

JAMES D. KEEGAN AND ADOLPH LÜHRS, OF NEW YORK, N. Y.

IMPROVEMENT IN DRIVE-COCKS FOR WATER-MAINS.

Specification forming part of Letters Patent No. 191,804, dated June 12, 1877; application filed April 16, 1877.

*To all whom it may concern:*

Be it known that we, JAMES D. KEEGAN and ADOLPH LÜHRS, both of New York city, New York, have invented a new and Improved Drive-Cock for Water-Main, of which the following is a specification:

Fig. 1 is a side view of our improved drive-cock, showing it applied to the water-main. Fig. 2 is a longitudinal central section on line $x\ x$, Fig. 1, and Fig. 3 a bottom view of the drive-cock.

Similar letters of reference indicate corresponding parts in all the figures.

This invention relates to an improved drive-cock for water-mains, which will keep out and prevent eels and other fish from entering and clogging the branch or supply pipes, and which, at the same time, will not reduce the flow, pressure, and head of water in the pipes that are connected to such cock.

The invention consists in securing within the drive-cock, near its inner end or mouth, a transverse rib, and in providing the drive-cock at its sides, but above the rib, with openings, all as is hereinafter more fully described.

In the drawing, the letter A represents a drive-cock of ordinary or suitable construction. With one end, $a$, it is driven into the water-main B, as shown, while its other end, $b^\times$, is to be connected with a suitable supply-pipe, that conducts the water from the main to the place where it is to be used.

The drive-cock A is, at the inner end $a$, traversed by a transverse rib, $b$, as shown in Fig. 3, which is placed entirely within the drive-cock, so as not to project beyond its lower edge. This rib $b$ bisects, by preference, the opening of the drive-cock, and may be cast in one piece with the body of the cock; or the rib $b$ may be sunk into notches formed in the end of the drive-cock, or fastened thereto in other suitable manner.

Instead of one, two or more ribs may be used. The inner part of the drive-cock—to wit, that which enters the water-main—is also provided at its sides with one, two, or more openings, $d\ d$, (see Fig. 1,) of an area exceeding that of the rib $b$. These openings $d$ are placed above the upper edge of the rib $b$, as clearly shown in Fig. 2, and allow water to enter the drive-cock from the sides.

It will be seen that, by placing the rib $b$ entirely within the drive-cock, it will effectively prevent fish that swim in the main from entering the drive-cock, but will not obstruct their course, nor tend to guide them into the drive-cocks, which would be the case if the rib projects from the cock. Even if small fish should clog one of the openings between the rib and one of the sides of the drive-cock, the openings $d$, being placed above the upper edge of the rib, would remain unobstructed, and sufficient water would still pass through them. If the openings were placed opposite the rib, and not above the same, they would be closed whenever a fish was caught at one side of the rib $b$.

We do not claim, broadly, a drive-cock having a cross-piece at the lower end and side openings adjacent to the cross-piece; but

We claim as our invention—

A drive-cock, the end of which, projecting within the main, is provided with a cross-piece, $b$, arranged wholly within the cock, and with side openings arranged above the cross-piece, as set forth.

JAMES D. KEEGAN.
ADOLPH LÜHRS.

Witnesses:
ERNEST C. WEBB,
F. V. BRIESEN.